United States Patent [19]

Durville

[11] Patent Number: 5,557,625
[45] Date of Patent: Sep. 17, 1996

[54] COUPLED-CAVITY RESONATOR TO IMPROVE THE INTENSITY PROFILE OF A LASER BEAM

[75] Inventor: Frederic M. Durville, Chelmsford, Mass.

[73] Assignee: Cynosure, Inc., Bedford, Mass.

[21] Appl. No.: 368,989

[22] Filed: Jan. 5, 1995

[51] Int. Cl.⁶ ........................................................ H01S 3/13
[52] U.S. Cl. .................................. 372/29; 372/92; 372/97; 372/19; 372/10
[58] Field of Search ................................... 372/97, 92, 93, 372/98, 108, 34, 25, 29, 19, 10

[56] References Cited

U.S. PATENT DOCUMENTS

| | | | |
|---|---|---|---|
| 4,291,281 | 9/1981 | Pinard et al. | 372/97 |
| 4,302,730 | 11/1981 | Jernigan | 372/97 |
| 4,435,808 | 3/1984 | Javan | 372/94 |
| 5,307,369 | 4/1994 | Kimberlin | 372/97 |

OTHER PUBLICATIONS

Polanyi, Thomas & Tobias, Irwin, *Lasers—A Series of Advances*, Edited by A. K. Levine, vol. 2, Marcel Dekker, Inc, N.Y., 1968, pp. 400, 402–403 & 422.

Tarasov, L. V., *Laser Physics*, Translated from Russion by Ram S. Wadhwa, MIR publishers, Moscow, pp. 178–181, Chapter 2, 1983.

*Primary Examiner*—Leon Scott, Jr.
*Attorney, Agent, or Firm*—Hamilton, Brook, Smith & Reynolds, P.C.

[57] ABSTRACT

The optical design of a laser resonator smooths out the intensity beam profile of the generated laser beam and prevents the formation of "hot-spots." The active laser resonator containing the active laser medium is optically coupled to a free space passive optical resonator to provide mixing and filtering of the spatial modes.

41 Claims, 4 Drawing Sheets

COUPLED-CAVITY RESONATOR TO IMPROVE THE INTENSITY PROFILE OF A LASER BEAM

BACKGROUND

In a typical laser resonator, an active laser medium is placed in an optical resonator or cavity comprising a set of mirrors. The active laser medium, being a gas, a liquid or a solid, or a combination thereof, contains the active atoms, ions, molecules or particles of matter that will generate the laser beam. This active medium is excited through transfer of external energy to active elements of the medium by some means such as an electrical discharge, an external source of light, a chemical reaction or any source of energy. The elements, which may be active atoms, ions, molecules or particles of matter, radiate some energy in the form of electromagnetic radiation or light. If this same light is partly or totally re-injected into the excited active laser medium, it stimulates the emission of additional light according to the principle of the stimulated emission process. As illustrated in FIG. 1, this is typically done by placing the active laser medium 1 inside an optical resonator or cavity formed by mirror 2 and a partially reflecting mirror 3. The generated laser beam is emitted through the mirror 3.

Many different configurations of optical resonators including wave-guide, ring, and stable and unstable configurations have been designed to achieve better quality laser beams or laser beams with specific characteristics such as single transverse or spatial mode, single longitudinal or frequency mode, or to better control some of the characteristics of the laser beam. Laser sources have also been used in a cascade configuration, where one well controlled laser source is used to control the subsequent ones, such as in a Master-Oscillator-Power-Amplifier or a seed-injected laser.

It remains that in some lasers, some minute inhomogeneities or perturbations inside the laser resonator can greatly deteriorate some of the characteristics of the laser beam. Such an example is a solid-state laser in which the active laser medium is a solid single crystal containing some active ions. In such a system, some minute optical inhomogeneities due for example to minute optical imperfections in the active crystal or other optical elements, or minute inhomogeneities in the excitation process and non-uniform excitation of the active laser medium, can lead to some unpredicted perturbations in the laser beam. This can sometimes generate some relatively strong variations in the spatial or cross-sectional or temporal intensity profile of the laser beam known as "hot-spots." These "hot-spots" can be described as local areas in the cross section of the laser beam or in the temporal intensity profile where the intensity of the laser beam greatly exceeds its average or expected value. Such "hot-spots" are usually undesirable, as they can lead to unwanted and unpredictable optical damages in the laser source itself or in other components, or unwanted and unpredictable effects in the use of the laser beam.

SUMMARY OF THE INVENTION

In this invention, a specific optical design of the laser resonator prevents the formation of such "hot-spots" in the spatial and temporal intensity distributions of a laser beam. In this device, the active laser cavity with the active laser medium is optically coupled to a secondary optical cavity.

It is preferred that the secondary optical cavity be a passive cavity such as a free-space cavity; that is, it is not an active cavity where laser emission takes place for optical gain. It is also preferred that the laser beam generated in and emitted from the active optical cavity include higher order transverse (spatial) modes and that the two cavities be mismatched at all transverse modes.

The secondary optical cavity modifies the spatial and/or temporal characteristics of the laser beam. In particular, this design can be used to prevent the formation of "hot-spots" in the laser beam cross-sectional or temporal intensity profile by providing a mismatch between the cavities at a main mode of the output beam which results in the "hot spots." The light emitted by the excited active laser medium is partly coupled into the passive optical cavity before being re-injected into the excited active laser medium. In this process, the spatial modes are filtered and mixed to some degree, leading to a spatial and temporal homogenization of the laser beam.

In one embodiment of the passive secondary optical cavity, the passive optical cavity is oriented axially in line with the active optical cavity. In another embodiment, the passive optical cavity is transversely oriented relative to the active optical cavity. There, the passive optical cavity is coupled to the active optical cavity by a beam splitter in the active optical cavity. The preferred beam splitter is a flat piece of uncoated optical glass oriented with respect to the axis of the laser beam in a manner such that the plane of incidence defined by the incident and reflected beams contains a plane of polarization of the laser beam generated in the active optical cavity. The passive optical cavity may include first and second reflectors positioned with the beam splitter therebetween. The active laser cavity may include a Q-switching element.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 2:
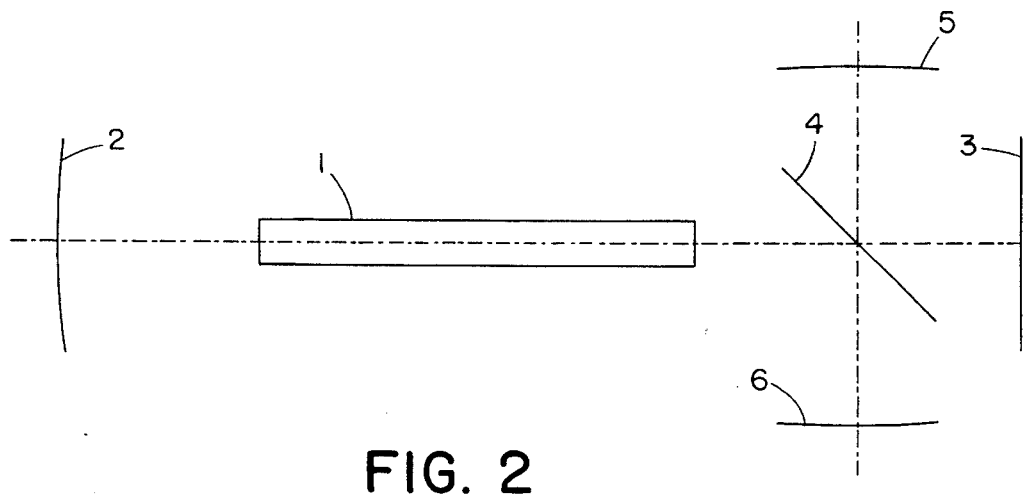
FIG. 2 is a schematic illustration of a cross-coupled-cavity laser resonator design.

One embodiment of the invention is illustrated in FIG. 2. As in conventional lasers, an optical cavity is formed between a totally reflecting mirror 2 and a partially reflecting mirror 3. The mirrors may be flat, convex or concave. However, in the illustrated embodiment the mirror 2 is concave, typically with a radius of curvature between 0.1 meters and 10 meters, and the partially reflecting mirror 3 is flat. The partially reflecting mirror typically reflects between 10% and 90% of the laser beam, and in a preferred system about 40% of the light is reflected.

In accordance with the present invention, a passive optical cavity comprising mirrors 5 and 6 is optically coupled to the active optical cavity by means of a partially reflecting beam-splitter 4. Although the mirrors 5 and 6 may be flat, it is preferred that they be concave, preferably with a radius of curvature between 0.1 meter and 10 meters. The partially reflecting mirror 4 may reflect a percentage of light within a great range, preferably less than 90% and most preferably about 10%.

The laser beam generated by the active optical cavity comprises resonant modes of different wavelength, spatial and temporal characteristics. "Hot spots" occur from those modes having an exceptionally high gain in the active optical cavity. The active and passive cavities have different resonant modes in view of their different geometry and dimensions, and the passive cavity geometry and dimensions can be selected such that the modes which create the "hot spots" in the active optical cavity are attenuated in the passive optical cavity. At least a portion of the light from the passive optical cavity is then reinjected into the active optical cavity, interfering with the high resonance at the "hot spots." In simple terms, light which is otherwise resonating at the "hot spots" is spatially redistributed by the passive cavity.

Although the above discussion refers to two cavities it can be seen from FIG. 2 that providing the passive cavity between mirrors 5 and 6 actually results in additional cavities such as between reflectors 5 and 3 and reflectors 2 and 6. Each cavity has its own resonant modes and can be expected to attenuate the modes which create the "hot spots."

Figure 3:
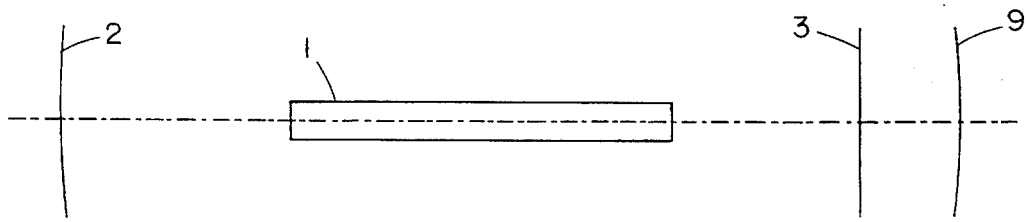
FIG. 3 is a schematic illustration of a longitudinal-coupled-cavity laser resonator design.

Although shown at a 45° angle, the beam-splitter 4 may be oriented at any angle with the passive cavity reoriented accordingly. In fact, in the extreme case, the passive optical cavity can be aligned axially with the active optical cavity as illustrated in FIG. 3. In this design, the beam-splitter 4 and two high reflectance mirrors 5 and 6 are replaced by a partially reflecting mirror 9. All the other elements may be identical in form and position as described above. In this case, in addition to the active optical cavity between reflectors 2 and 3 there is an additional passive cavity between reflectors 3 and 9 as well as yet another cavity between reflectors 2 and 9. In one implementation of this embodiment, the partially reflecting mirror 9 has a concave radius of curvature of one meter facing the active laser medium 1 and a convex radius of curvature of one meter facing opposite the active laser medium, and the mirror has a reflectivity of 10%. The partially reflecting mirror 9 is located a distance of 50 millimeters from the partially reflecting mirror 3. However, as in the embodiment of FIG. 2, a wide range of mirror types and distances provide the desired attenuation of "hot spots."

Although optical coupling of a passive cavity to a laser cavity has been suggested by L. V. Tarasov, in *Laser Physics.*, published in English by MRI publishers in Moscow, 1983, and by T. C. Polanyi and I. Tobias in *Lasers*, Vol. 2, edited by A. K. Levine, published by Marcel Dekker, Inc., in New York, 1968, that coupling obtains significantly different results. In that system, longitudinal modes were selected by coupling a passive optical cavity having a single resonant longitudinal mode in common with the active cavity. As a result, that single longitudinal mode, or wavelength, was preferentially selected by the laser system. Whereas the prior system was designed to obtain one preferential wavelength, the present system obtains a transverse resonant mode mismatch between the cavities to attenuate spatial or temporal "hot spots."

The prior system would not have included higher order transverse modes in the output beam and would not have had mismatch of all transverse modes as is preferred with the present invention. In general, a laser whose beam has a diffraction limit greater than or equal to 2 has higher transverse (spatial) modes. Where the diffraction limit is less than 2, the laser has only low order transverse modes.

To further attenuate the "hot spots," an aperture may be positioned anywhere within the passive cavity to fully block the radiation from the "hot spots."

Figure 4:
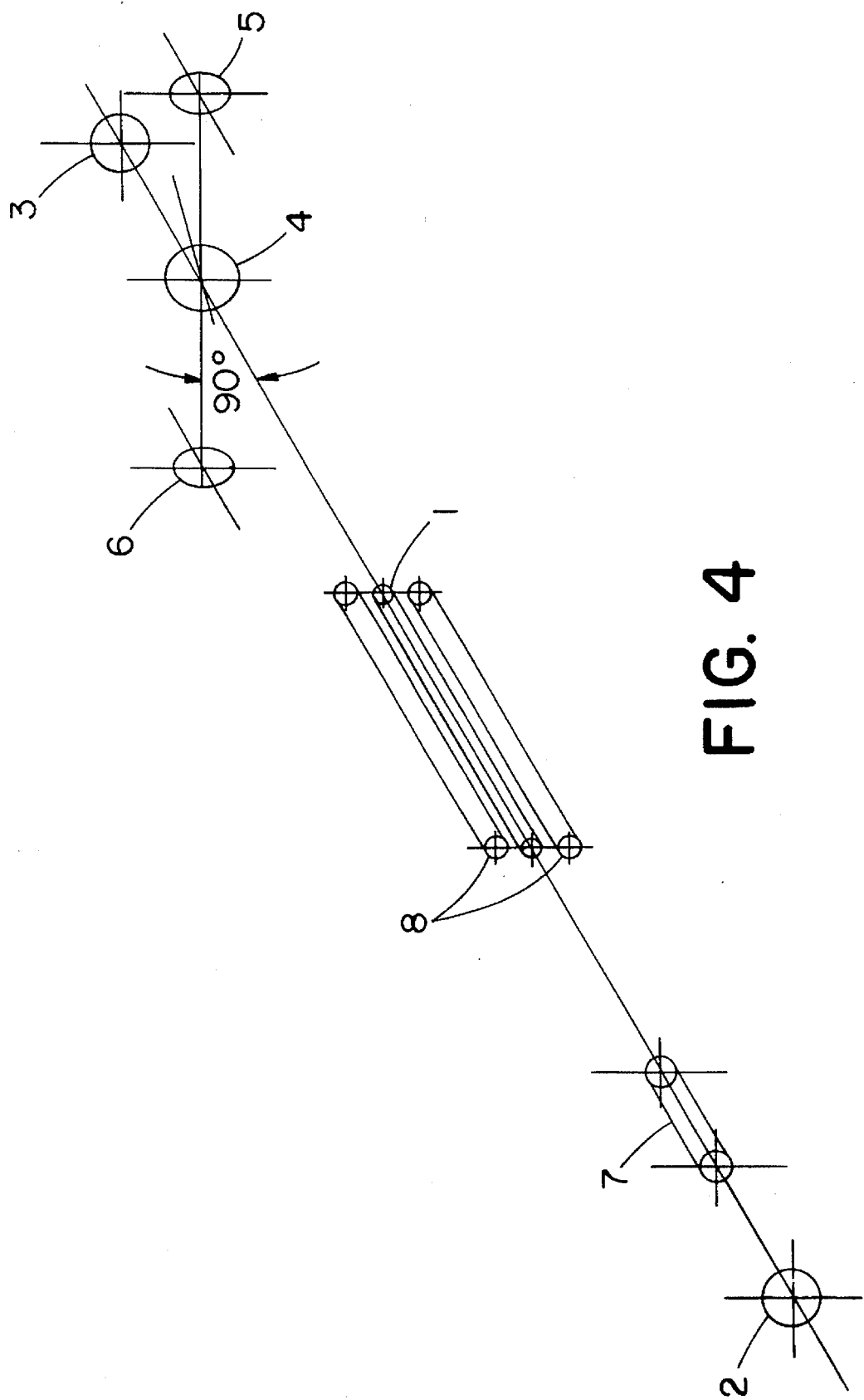
FIG. 4 is a perspective view of a Q-switched Alexandrite laser resonator embodying the invention with a cross-coupled-cavity design.

One preferred embodiment of this invention is a coupled-cavity Q-switched Alexandrite laser resonator as illustrated in FIG. 4. In this system, the active laser medium 1 is a cylindrical laser rod of Alexandrite $Be(Al_{1-x}Cr_x)_2O_4$ crystal in which the $Cr^{3+}$ ions are the active elements responsible for the emission of lights around 752 nm. These $Cr^{3+}$ ions are optically excited or pumped by two linear flash-lamps 8 located parallel to the laser rod and on opposite sides as illustrated in FIG. 4. The laser rod is 10.16 cm long and 6.35 mm in diameter, and the flash lamps have an arc length of 8.89 cm and a bore diameter of 5 mm. The two flash lamps and the laser rod are mounted inside a close-coupled diffuse reflector to provide efficient optical coupling between the flash lamps and the laser rod and therefore an efficient pumping or excitation of the $Cr^{3+}$ ions. The laser rod is oriented so that the polarization of the generated laser beam is in a plane perpendicular to the plane containing the two flash lamps. The active laser cavity is formed by a high reflecting mirror 2 having a concave radius of curvature of 3 m and a flat partially reflecting mirror 3 reflecting 40% of the light emitted by the laser rod. The two mirrors are separated by a distance of 0.44 m, and the middle of the laser rod is located 0.22 m from the high reflecting mirror.

To achieve a short laser pulse, an electro-optic Pockels cell 7 is inserted inside the active cavity with its optical axes oriented at 45° with respect to the polarization plane of the light emitted by the laser rod. When a high voltage of approximately 1,800 V is applied across this Pockels cell, it introduces an optical retardation in the light emitted by the laser rod effectively resulting in a rotation of 90° of the polarization plane of said light after it travels from the laser rod through the Pockels cell to the High Reflector and back through the Pockels cell to the laser rod. At this point, the returning light having its polarization plane shifted at 90° with respect to the originally emitted light is not amplified through the excited laser rod. This results in the lack of laser beam generation. When no voltage is applied to the Pockels cell, no optical retardation is introduced in the light emitted by the laser rod, and therefore the generation of the laser beam takes place. The modulation or switching of the high voltage across the Pockels cell results in the modulation or switching of the quality or Q factor of the laser cavity. Emission of the laser beam is prevented when the Q factor of the laser cavity is low, and enabled when the Q factor is high. In the case of the present system a high Q factor corresponds to no high voltage across the Pockels cell, and a low Q factor is achieved by applying the corresponding high voltage across the Pockels cell. This allows efficient storage of the excitation energy inside the laser rod by the $Cr^{3+}$ ions during the flash-lamp pulse, and immediate release of this energy in the generation of what is known as a giant laser pulse.

Figure 1:
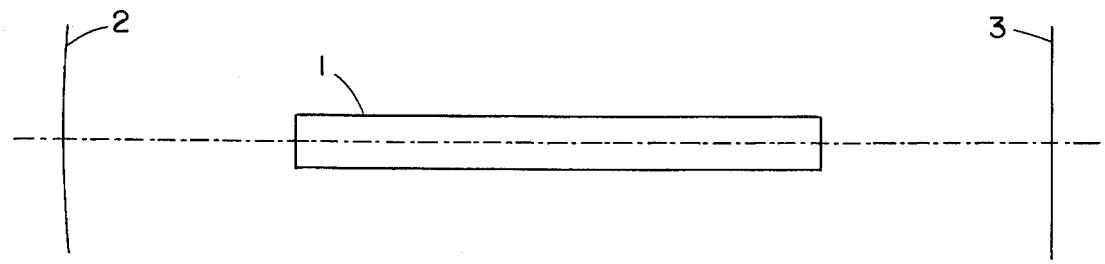
FIG. 1 is a schematic illustration of a standard linear laser resonator design.
Figure 5:
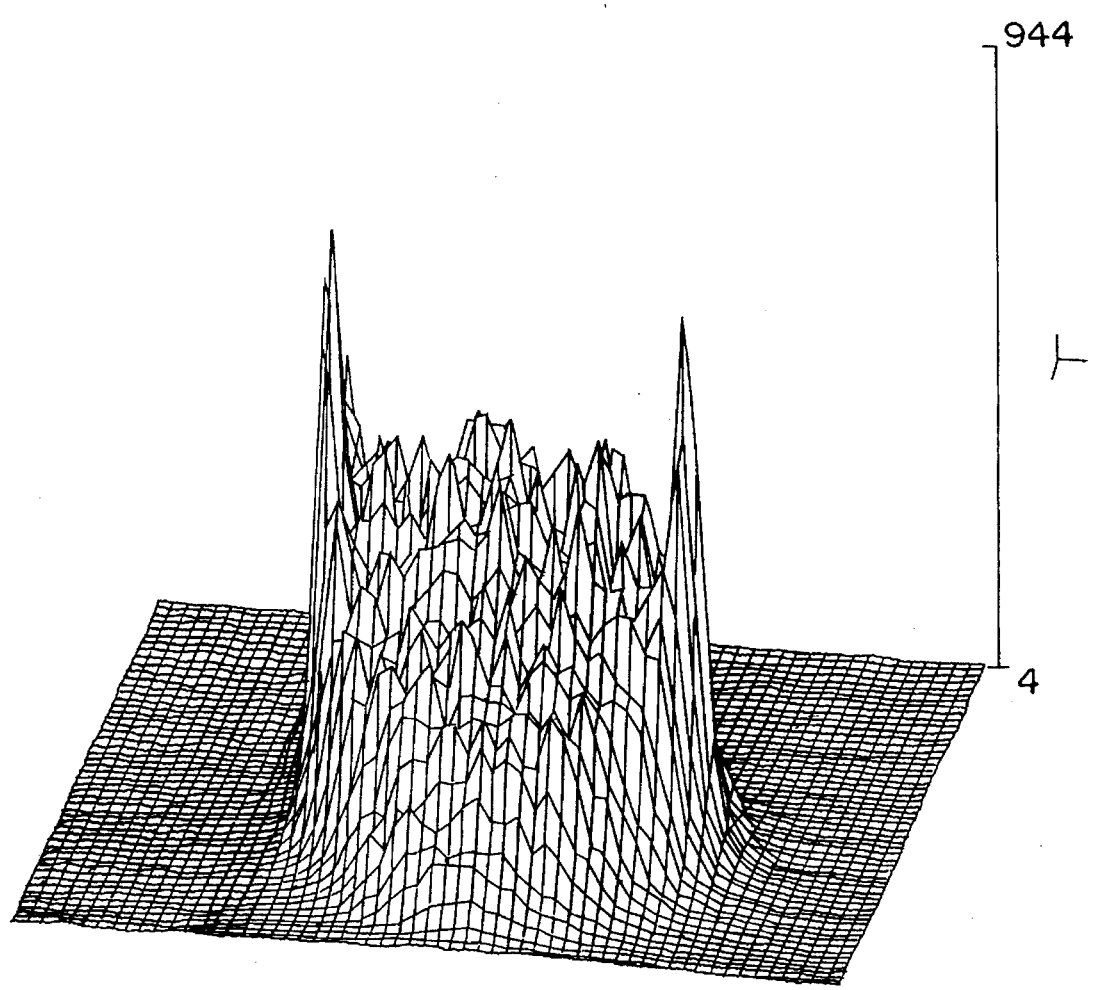
FIG. 5 illustrates a typical spatial intensity profile of a Q-switch Alexandrite laser beam generated using a standard linear resonator as illustrated in FIG. 1.

In this system, time duration of the laser pulse is of the order of 40 nsec to 200 nsec, and depends on the amount of energy that is stored and released by the $Cr^{3+}$ ions. Repetition rate may be between 1 Hz and 10 Hz. The pulse energy generated by this laser system varies between 0.1 J and 1 J. When a simple optical cavity as illustrated in FIG. 1 is used for this type of laser, the spatial intensity profile of the laser beam exhibits some "hot-spots" as illustrated in FIG. 5.

Figure 6:
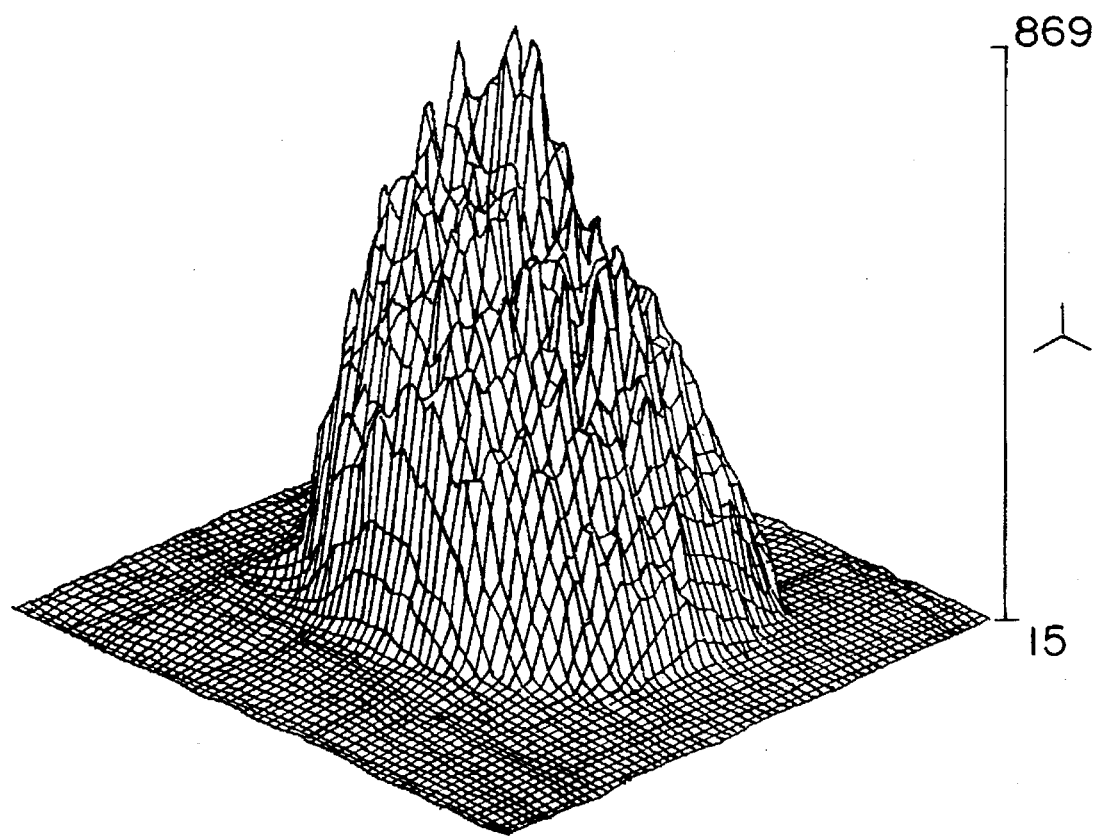
FIG. 6 illustrates a typical spatial intensity profile of a Q-switch Alexandrite laser beam generated using a preferred embodiment of the invention as illustrated in FIG. 4.

In the described preferred embodiment of this invention, the active cavity is coupled to a passive cavity by the use of a 45° beam-splitter 4 consisting of a flat uncoated piece of optical glass located 50 mm from the flat partially reflecting mirror 3 and at mid-distance between the two mirrors of the passive cavity 5 and 6. The passive cavity is formed by two high reflectance mirrors 5 and 6 having a concave radius of curvature of 3 m, separated by a distance of 50 mm, and located equidistant from the beam-splitter 4. When this piece of glass is oriented at 45° with respect to the laser beam axis, such that the passive optical cavity is oriented at 90°, and further in a manner such that the plane of incidence defined by the incident and reflected beams contains the polarization of the light emitted by the laser rod as illustrated in FIG. 4, it reflects approximately 8% of the incident light on each surface. By comparison, if the glass were oriented such that the plane of incidence is perpendicular to the polarization, only about 1% of the light would be reflected. On the other hand, reflection can be made independent of that orientation by the use of suitable coatings on the glass. This reflected light then resonates inside the passive cavity formed by the two mirrors 5 and 6, and a fraction of it is reflected by the same beam-splitter 4 back into the active cavity. The coupling of the two cavities results in a spatial filtering and mixing of the different spatial modes of the light emitted by the laser rod. This process is most important in a Q-switched laser during the initial build-up of the giant laser pulse following immediately the switching from a low Q factor to a high Q factor of the laser cavity. The giant laser pulse generated by this invention exhibits a smooth spatial beam profile as illustrated in FIG. 6.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A laser comprising:
    first and second optical reflecting elements defining an active optical cavity, containing an active laser medium, for amplifying light at resonant modes supported by the cavity to generate a laser beam; and
    at least a third optical reflecting element defining a secondary optical cavity, coupled to the active optical cavity, the third optical element determining a geometry of the secondary optical cavity, the geometry of the secondary optical cavity causing a mismatch of the secondary optical cavity relative to the active optical cavity at resonant modes contributing to hot spots in a spatial intensity distribution of the laser beam thereby attenuating energy contained in the resonant modes contributing to the hot spots.

2. A laser as claimed in claim 1 wherein the secondary optical cavity is a passive optical cavity.

3. A laser as claimed in claim 2 wherein the passive optical cavity is oriented axially in line with the active optical cavity.

4. A laser as claimed in claim 2 wherein the passive optical cavity is transversely oriented relative to the active optical cavity.

5. A laser as claimed in claim 4 wherein the passive optical cavity is coupled to the active optical cavity by a beam splitter in the active optical cavity.

6. A laser as claimed in claim 5 wherein the passive optical cavity comprises first and second reflectors positioned with the beam splitter therebetween.

7. A lasers as claimed in claim 5 wherein the beam splitter comprises a flat piece of uncoated optical glass oriented with respect to the axis of the laser beam in a manner such that the plane of incidence defined by the incident and reflected beams contains a plane of polarization of the laser beam generated in the active optical cavity.

8. A laser as claimed in claim 7 further comprising a Q-switching element in the active laser cavity.

9. A laser as claimed in claim 1 wherein the laser beam generated and emitted from the active optical cavity includes higher order modes.

10. A laser comprising:
    an active optical cavity, containing an active laser medium, for amplifying light to generate a laser beam; and
    a secondary optical cavity, coupled to the active optical cavity, for attenuating hot spots in a spatial intensity distribution of the laser beam by being significantly mismatched relative to the active optical cavity at substantially all transverse modes of the laser beam.

11. A laser as claimed in claim 1 wherein the second optical cavity reduces the energy contained in the resonant modes contributing to the hot spots by redistributing the energy into other resonant modes of the active optical cavity not contributing to the hot spots.

12. A laser comprising:
    an active optical cavity containing an active laser medium; and
    secondary optical cavity means, coupled to the active optical cavity, for providing significant spatial mismatching relative to the active optical cavity at a main mode of a laser beam generated in and emitted from the active optical cavity.

13. A laser as claimed in claim 12 wherein the secondary optical cavity means is a passive optical cavity.

14. A laser as claimed in claim 13 wherein the passive optical cavity is oriented axially in line with the active optical cavity.

15. A laser as claimed in claim 13 wherein the passive optical cavity is transversely oriented relative to the active optical cavity.

16. A laser as claimed in claim 15 wherein the passive optical cavity is coupled to the active optical cavity by a beam splitter in the active optical cavity.

17. A laser as claimed in claim 16 wherein the passive optical cavity comprises first and second reflectors positioned with the beam splitter therebetween.

18. A laser as claimed in claim 16 wherein the beam splitter comprises a flat piece of uncoated optical glass oriented with respect to the axis of the laser beam in a manner such that the plane of incidence defined by the incident and reflected beams contains a plane of polarization of the laser beam generated in the active optical cavity.

19. A laser as claimed in claim 18 further comprising a Q-switching element in the active laser cavity.

20. A laser as claimed in claim 12 wherein the laser beam generated in and emitted from the active optical cavity includes higher order transverse modes.

21. A laser as claimed in claim 12 wherein the secondary optical cavity means is significantly mismatched relative to the active optical cavity at all transverse modes of the laser beam.

22. A method of attenuating hot spots in the spatial intensity distribution of a laser beam comprising:

generating a laser beam in an active optical cavity;

coupling a secondary optical cavity to the active optical cavity to receive a portion of the laser beam in the second optical cavity generated in the active optical cavity; and returning at least a portion of the received light to the active optical cavity to reduce energy contained in resonant modes contributing to hot spots.

23. A method as claimed in claim 22 wherein the secondary optical cavity is a passive optical cavity.

24. A method as claimed in claim 23 wherein the passive optical cavity is oriented axially in line with the active optical cavity.

25. A method as claimed in claim 23 wherein the passive optical cavity is transversely oriented relative to the active optical cavity.

26. A method as claimed in claim 25 wherein the passive optical cavity is coupled to the active optical cavity by a beam splitter in the active optical cavity.

27. A method as claimed in claim 26 wherein the passive optical cavity comprises first and second reflectors positioned with the beam splitter therebetween.

28. A method as claimed in claim 26 wherein the beam splitter comprises a flat piece of uncoated optical glass oriented with respect to the axis of the laser beam in a manner such that the plane of incidence defined by the incident and reflected beams contains a plane of polarization of the laser beam generated in the active optical cavity.

29. A method as claimed in claim 28 further comprising Q-switching the active laser cavity.

30. A method as claimed in claim 22 wherein the laser beam generated in the active optical cavity includes higher order transverse modes and the secondary optical cavity is mismatched relative to the active optical cavity at a main mode of the laser beam generated in and emitted from the active optical cavity.

31. A method as claimed in claim 22 wherein the secondary optical cavity is mismatched relative to the active optical cavity with respect to all transverse modes of the laser beam.

32. A method as claimed in claim 22 further comprising redistributing the energy from the resonant modes contributing to the hot spots to other resonant modes that do not contribute to the hot spots.

33. A laser comprising:

first and second optical reflecting elements defining an active optical cavity containing an active laser medium; and at least a third optical reflecting element defining a secondary optical cavity, coupled to the active optical cavity, the third optical element determining a geometry of the secondary optical cavity, the geometry of the secondary optical cavity causing a mismatch of the secondary optical cavity relative to the active optical cavity at resonant modes contributing to hot spots in the temporal intensity distribution of a laser beam generated in the active optical cavity thereby reducing energy contained in the resonant modes contributing to the hot spots.

34. A laser as claimed in claim 35 wherein the secondary optical cavity means is a passive optical cavity.

35. A laser comprising:

an active optical cavity containing an active laser medium; and secondary optical cavity means coupled to the active optical cavity, for providing significant mismatching relative to the active optical cavity at a main mode of a laser beam generated in and emitted from the active optical cavity to decrease the contribution of the main mode to the laser beam.

36. A laser as claimed in claim 35 wherein the secondary optical cavity is a passive optical cavity.

37. A laser comprising:

an active optical cavity, containing an active laser medium, for amplifying light at resonant modes of the cavity to generate a laser beam; and a secondary optical cavity being dimensioned relative to the active optical cavity to attenuate hot spots in a spatial intensity distribution of the laser beam by reducing energy contained in resonant modes contributing to the hot spots and redistribute the energy into other resonant modes of the active optical cavity not contributing to the hot spots.

38. A laser comprising:

an active optical cavity containing an active laser medium; and a secondary optical cavity being dimensioned relative to the active optical cavity to provide significant spatial mismatching relative to the active optical cavity at a main mode of a laser beam generated in and emitted from the active optical cavity.

39. A laser as claimed in claim 38 wherein the laser beam generated in and emitted from the active optical cavity includes higher order transverse modes.

40. A laser as claimed in claim 38 wherein the secondary optical cavity is significantly mismatched relative to the active optical cavity at all transverse modes of the laser beam.

41. A laser as claimed in claim 38 wherein the second optical cavity reduces an energy contained in the main mode of the laser beam and redistributes the energy into other modes of the laser beam.

\* \* \* \* \*

UNITED STATES PATENT AND TRADEMARK OFFICE
CERTIFICATE OF CORRECTION

PATENT NO.   : 5,557,625
DATED        : Sept. 17, 1996
INVENTOR(S)  : Frederic M. Durville It is certified that error appears in the above-indentified patent and that said Letters Patent is hereby corrected as shown below:

Column 8, line 20, replace "Claim 35" with
--Claim 33--.

Signed and Sealed this

Thirty-first Day of December, 1996

Attest:

BRUCE LEHMAN

*Attesting Officer*    *Commissioner of Patents and Trademarks*